United States Patent
Smith

(10) Patent No.: US 11,948,014 B2
(45) Date of Patent: Apr. 2, 2024

(54) MULTI-TENANT CONTROL PLANE MANAGEMENT ON COMPUTING PLATFORM

(71) Applicant: Google LLC, Mountain View, CA (US)

(72) Inventor: Daniel Veritas Smith, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 63 days.

(21) Appl. No.: 17/122,177

(22) Filed: Dec. 15, 2020

(65) Prior Publication Data

US 2022/0188170 A1 Jun. 16, 2022

(51) Int. Cl.
*G06F 9/48* (2006.01)
*G06F 9/50* (2006.01)
*G06F 9/54* (2006.01)

(52) U.S. Cl.
CPC ............ *G06F 9/5072* (2013.01); *G06F 9/485* (2013.01); *G06F 9/5077* (2013.01); *G06F 9/547* (2013.01); *G06F 2209/505* (2013.01)

(58) Field of Classification Search
CPC ............ H04L 41/0806; H04L 41/0853; H04L 41/0866; H04L 41/042; H04L 41/046; H04L 41/5054; H04L 41/5096; H04L 67/34; G06F 9/45558; G06F 9/5077; G06F 9/3009; G06F 9/5072

See application file for complete search history.

(56) References Cited

U.S. PATENT DOCUMENTS

| | | | |
|---|---|---|---|
| 11,188,354 B1* | 11/2021 | Yu | G06F 9/455 |
| 2017/0337074 A1* | 11/2017 | Tsirkin | G06F 9/45558 |
| 2019/0179668 A1* | 6/2019 | Wang | G06F 9/4881 |
| 2019/0222988 A1* | 7/2019 | Maes | H04W 4/50 |
| 2020/0106696 A1* | 4/2020 | Michael | H04L 45/122 |
| 2020/0257566 A1* | 8/2020 | Ganguli | B25J 15/0014 |
| 2021/0211391 A1* | 7/2021 | Paraschiv | G06F 9/3877 |

(Continued)

OTHER PUBLICATIONS

C. Zheng, Q. Zhuang and F. Guo, "A Multi-Tenant Framework for Cloud Container Services," 2021 IEEE 41st International Conference on Distributed Computing Systems (ICDCS), 2021, pp. 359-369, doi: 10.1109/ICDCS51616.2021.00042. Retrieved from Internet Apr. 11, 2021. (Year: 2021).*

(Continued)

*Primary Examiner* — Tom Y Chang
(74) *Attorney, Agent, or Firm* — Lerner David LLP

(57) ABSTRACT

Methods, systems, devices, and computer-readable storage media for managing a multi-tenant cloud computing platform. Rather than maintain cluster control planes separately for each tenant, a cloud provider control plane implemented on one or more nodes can manage the creation, allocation, execution, and destruction of cluster control planes in an on-demand way. Computing resources can be used more efficiently at least because resources are not under-utilized. Adding additional tenants can be done with zero or small marginal cost per-tenant, because cluster control planes for servicing requests by the tenant are executed in response to a request, but destroyed when a tenant for the plane is idle. Multiple instances of an API server implementing a platform API for communicating between devices of the platform and clusters of computing resources can be generated and modified on a per-tenant basis.

20 Claims, 5 Drawing Sheets

(56) References Cited

U.S. PATENT DOCUMENTS

2021/0271513 A1* 9/2021 Tiwary .................. G06F 9/5027
2021/0373956 A1* 12/2021 Krasner ................ G06F 9/5027

OTHER PUBLICATIONS

Kubernetes Components. Aug. 28, 2020. Retrieved from the Internet: <https://v1-19.docs.kubernetes.io/docs/concepts/overview/components/. pp. 1-4.
The Kubernetes API. Jul. 17, 2020. Retrieved from the Internet: <https://v1-18.docs.kubernetes.io/docs/concepts/overview/kubernetes-api/. 4 pages.
Istioldie 1.2 / Multicluster Deployments. Sep. 12, 2019. Retrieved from the Internet: <https://istio.io/v1.2/docs/concepts/multicluster-deployments/. 4 pages.
Istioldie 1.2 / Multiple control planes. Sep. 12, 2019. Retrieved from the Internet: <https://istio.io/v1.2/docs/setup/kubernetes/install/multicluster/gateways/. 11 pages.
International Search Report and Written Opinion for International Application No. PCT/US2021/042998 dated Nov. 5, 2021. 14 pages.
The Kubernetes API, https://kubernetes.io/docs/concepts/overview/kubernetes-api/, retrieved from the internet on Oct. 22, 2020, 2 pages.
Screen captures from YouTube video clip entitled "A Vision for API Machinery: Coming to Terms with the Platform we Built,", 1 page, uploaded on Dec. 15, 2018 by Daniel Smith. Retrieved from Internet: <https://youtu.be/u6wel_3WVTM>.
Screen captures from YouTube video clip entitled, "Kubernetes SIG API Machinery Oct. 7, 2020," 1 page, uploaded on Oct. 7, 2020 by Federico Bongiovanni. Retrieved from internet <https://www.youtube.com/watch?v=n1L5a09wWas&feature=youtu.be>.
Thetirefire/badidea, Retrieved from the Internet Oct. 29, 2020: <URL:http://<https://github.com/thetirefire/badidea>, 2 pages.
Controllers, <https://kubernetes.io/docs/concepts/architecture/controller/>, retrieved from the internet on Oct. 12, 2020, 3 pages.
Cluster multi-tenancy. Kubernetes Engine Documentation, Google Cloud. Nov. 23, 2020. pp. 1-7. Retrieved from the Internet: <https://cloud.google.com/kubernetes-engine/docs/concepts/multitenancy-overview>.
A Virtual Cluster Based Kubernetes Multi-tenancy Design. pp. 1-6. Retrieved from the Internet on Dec. 9, 2020: <https://docs.google.com/document/d/1EELeVaduYZ65j4AXg9bp3Kyn38GKDU5fAJ5LFcxt2ZU/edit>.

* cited by examiner

MULTI-TENANT CONTROL PLANE MANAGEMENT ON COMPUTING PLATFORM

BACKGROUND

A cloud computing platform is a system of computers maintained by a provider for providing computing resources and services to one or more users. The platform can allocate different quantities of computing resources to a user, who in turn can use the allocated resources for performing tasks, such as hosting their own services and software applications on the allocated resources. The cloud computing platform can provide computing resources that can otherwise be prohibitively expensive for a user to buy and directly maintain. The platform can provide a series of abstractions between hardware of the platform and the platform user. Abstraction to users of the platform can appear in different forms, such as an infrastructure-as-a-service (IaaS), platform-as-a-service (PaaS), or software-as-a-service (SaaS) paradigm.

Different users of the platform, such as individuals, organizations, or programs interacting with the platform, can collectively be represented as a tenant. A tenant can include one or more platform users, computing resources associated with the tenant, and one or more policies identifying how the computing resources should be accessed by the one or more platform users. The computing resources can include one or more worker nodes allocated to the tenant, as well as one or more computing devices reserved for executing the cluster control plane for the tenant. A cluster control plane can be configured to facilitate responding to requests from platform users of the tenant to read or write data for the tenant.

The platform may allocate computing resources to provision each tenant on the same shared computing resources of the platform. However, managing the platform in this multi-tenant approach can create problems, particularly when computing resources for different tenants are shared on the same cluster of nodes representing computing resources. Allocation of computing resources can also be difficult to effectively isolate between tenants whose allocated computing resources are co-located with those of other tenants.

On the other hand, designating separate nodes for each cluster control plane can be inefficient and expensive. One reason is because nodes on a computing platform are often discretely partitioned according to a fixed minimum size, such as a minimum setting of available computing resources for a single virtual machine, or a minimum allocation of computing resources measured in processor cycles or memory size. Another reason can be that cluster control planes can each have a fixed overhead cost to implement that does not decrease with the number of cluster control planes executing at a time. A cluster control plane for a tenant with only a few nodes on a cluster can often underutilize even the smallest available node available to execute a corresponding control plane.

SUMMARY

The present disclosure provides for managing multiple tenants each with a dedicated control plane on a computing platform. A cloud provider control plane can manage each control plane for a respective tenant as one or more threads of a process executing a plurality of threads. The cloud provider control plane can receive a request from a tenant to modify the state of a cluster corresponding to computing resources of the tenant. The cloud provider control plane can determine whether a current cluster control plane is active for the requesting tenant. If not, the cloud provider control plane can spawn one or more threads that execute a cluster control plane for managing nodes corresponding to the requesting tenant. As part of executing the cluster control plane, the cloud provider control plane can generate one or more instances of a modified Application Programming Interface (API) server implemented on the computing platform and configured to process incoming requests formed according to a platform API. The cloud provider control plane can manage binaries or other executable software for different instances of the API server that can be modified in different ways. As described herein, in response to an API request, the cluster control plane engine can spawn threads to execute an API server instance modified in accordance with the need to run in a multi-tenant process and provided with configuration data for a particular tenant.

Aspects of the disclosure can be implemented as a multi-tenant computing platform, or as a modification of a single-tenant computing platform to allow for multi-tenant functionality. The platform can be a containerized environment in which the platform is configured to orchestrate the creation, allocation, and destruction of different containers executing on the platform. In some implementations, the platform can be configured for object storage services (OSS) to allow for storage of data on behalf of different platform users. In those implementations, the platform can implement aspects of this disclosure to provide for OSS in a multi-tenant manner.

A computing platform not currently configured for multi-tenancy can be modified as described herein to enable multi-tenant operation. A computing platform can include a single API server servicing requests to the computing platform, which can be modified according to aspects of this disclosure to provide for servicing API requests for different tenants that have different requirements for interaction with the computing platform. Modifying an existing platform can be beneficial to leverage existing infrastructure and integrations, as opposed to implementing a new platform from the ground-up.

In this way, the cloud provider control plane can be implemented on computing resources that scales with the need for the cloud provider control plane in the aggregate, because there can be zero or small marginal cost associated with provisioning individual tenants. Fixed costs associated with executing an individual cluster control plane can be amortized over a large number of tenants each corresponding to a respective cluster control plane. In other words, the cloud provider control plane can effectively handle multiple cluster control planes for multiple tenants, all while preserving isolation between the tenants as described according to aspects of the following disclosure.

In general, one innovative aspect of the subject matter described in this specification provides for a system including: one or more processors; and one or more storage devices in communication with the one or more processors, the one or more storage devices storing instructions, when executed by the one or processors, cause the one or more processors to perform operations including: maintaining a plurality of cluster control planes, each cluster control plane comprising one or more respective instances of software of an Application Programming Interface (API) server, wherein each cluster control plane is configured to receive API requests and to process the API requests using the respective one or more instances of the API server; receiving an API request to modify or read a state for the cluster of computing resources of a computing platform; and in response to receiving the API request: identifying a cluster control plane of the plurality of cluster control planes corresponding to the API request, and causing the identified cluster control plane to modify or read the state of the cluster in accordance with the API request.

Causing the identified cluster control plane to modify or read the state of the cluster can include causing the identified cluster control plane to modify the execution of one or more worker nodes associated with the cluster control plane.

The API request can be a first API request, and the operations can further include: receiving a second API request to modify or read a state for the cluster, wherein the second API request specified computing resources different than the computing resources of the first API request; determining that the plurality of cluster control planes does not comprise a cluster control plane corresponding to the tenant identified in the second API request, and in response to the determining, spawning one or more threads to execute an API server instance configured to modify the state of the cluster in accordance with the second API request.

The spawned one or more threads executing the one or more respective instances can be configured to communicate data across one or more channels, wherein each thread is configured to communicate among other threads using the one or more channels, wherein each channel is a data structure configured to store data communicated between threads.

The operations can further include destroying at least one thread of the one or more spawned threads following a predetermined time period after executing the second cluster control plane to modify or read the state of the cluster.

Causing the cluster control plane to modify or read the state of the cluster can include: maintaining a pool of controllers, each controller comprising one or more threads configured to modify or read a state for one or more clusters; configuring a first controller from the pool of controllers to modify or read the state of the cluster comprising the one or more target nodes; removing the first controller from the pool of controllers; causing the identified cluster control plane to modify or read the state of the cluster using the first controller; and destroying the first controller after using the first controller.

The cluster can include a plurality of discrete portions of computing resources, wherein each discrete portion of the plurality of discrete portions of the cluster can include a resource identifier uniquely identifying the discrete portion of computing resources of the cluster; wherein the API request can include metadata that includes resource identifiers; and wherein identifying the cluster control plane can include identifying a cluster control plane that corresponds to resources whose identifiers match the resource identifiers in the metadata of the API request.

The plurality of discrete portions of computing resources can include at least one of an application, a service, a load balancer, a node, a pod, or a container.

Maintaining the plurality of cluster control planes can further include: storing data shared among the plurality of cluster control planes in a shared cache memory accessible to the plurality of cluster control planes, wherein the data is stored immutably.

Each of the plurality of cluster control planes can correspond to a tenant of the computing platform, and wherein the operations can further include: generating a cluster control plane comprising an instance of the API server, wherein the generating includes executing the instance of the API server according to a configuration specified by a tenant corresponding to the cluster control plane.

Maintaining the plurality of cluster control planes can further include storing, in separate caches of memory, respective data unique to each of the plurality of cluster control planes, wherein data stored in one of the separate caches for a first cluster control plane of the plurality of cluster control planes is not accessible by a second control plane of the plurality of cluster control planes.

Other implementations of the foregoing aspect can include a computer-implemented method performed on a computing device, an apparatus, and computer programs recorded on one or more computer-readable storage media.

BRIEF DESCRIPTION OF THE DRAWINGS

Like reference numbers in the drawings indicate like elements.

DETAILED DESCRIPTION

Overview

A cloud computing platform can implement a cloud provider control plane for managing multiple tenants of the platform. A cloud provider control plane can manage each cluster control plane for a respective tenant as one or more threads of a process executing a plurality of threads. The cloud provider control plane can include a cluster control plane engine, configured to generate one or more instances of an API server, configured to process incoming requests originally defined by the API server implementing a platform API on the computing platform. The original platform API can refer to an API defined by the cloud computing platform for single tenant operation. According to aspects of this disclosure, the computing platform described herein can be implemented from an existing platform implementing a platform API and configured for single tenant operation.

The instances can be modifications of a native platform API implemented on a platform and can allow for multi-tenant operation where originally the computing platform was configured for single tenant operation. For each process, the process can include a respective instance of a cluster control plane for a particular tenant, which itself may be running zero or more API server instances across one or more computing devices of the computing platform. The API server instances can execute a modified version of the platform API, but be configured to receive API requests formatted in accordance with the platform API. The modified version can provide at least some of the functionality provided by the original platform API implemented by the computing platform, including using similar or same syntax or mechanisms, such as wire transfer mechanisms. In this way, platform users can communicate with the cloud provider control plane using the platform API, but individual requests can be handled across one or more cluster control plane engines implementing a plurality of different API server instances.

Figure 1:
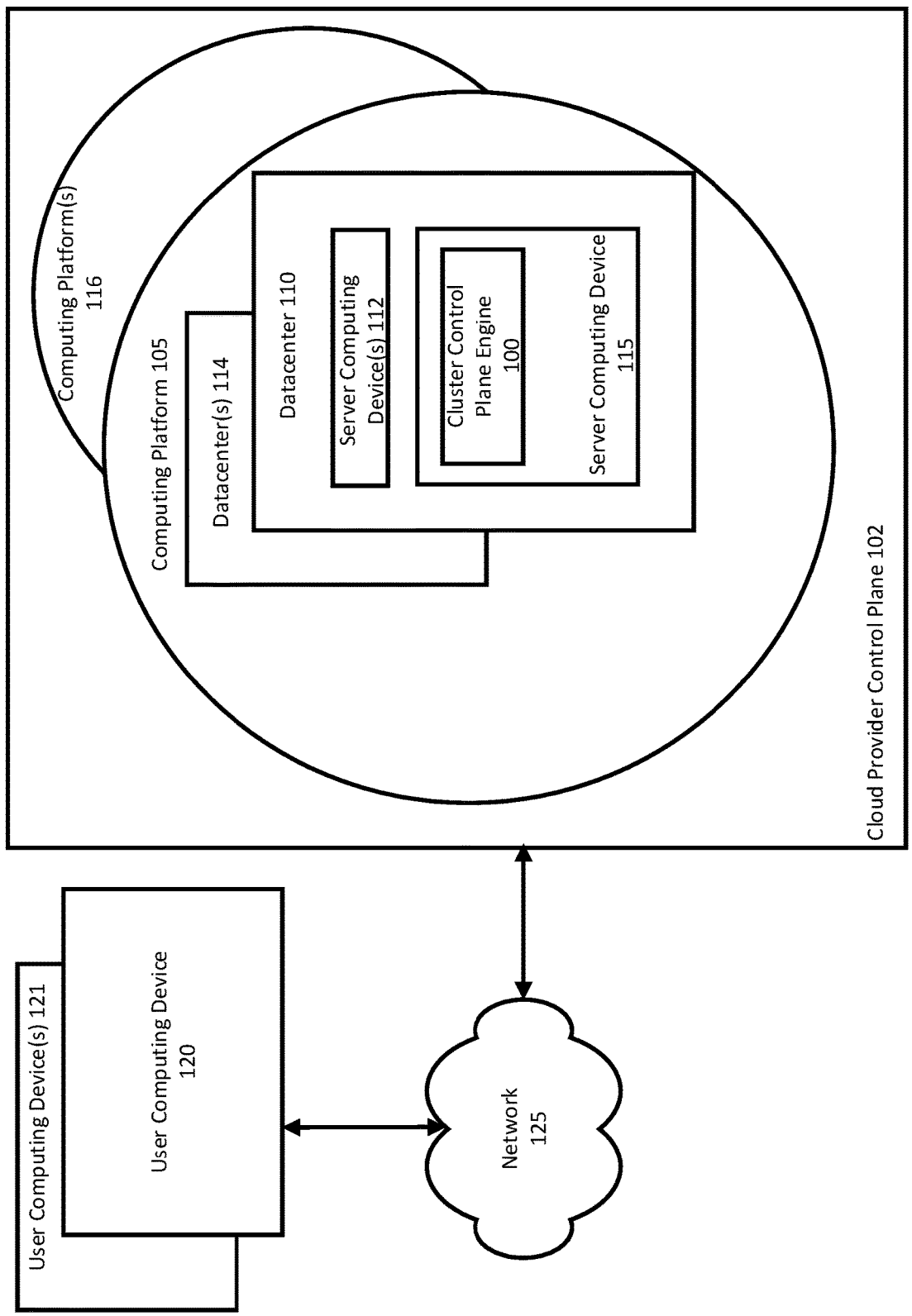
FIG. 1 is a block diagram of an example cloud computing platform implementing a cloud provider control plane according to aspects of this disclosure.

As shown in FIG. 1, platform users can interact with resources of a computing platform through a cloud provider control plane 102. In general, the cloud provider control plane 102 exposes the resources of a computing platform through a platform API, which itself may be one or more separately defined APIs. As described herein, the platform API can define one or more APIs for platform users and tenants to communicate with the platform through the cloud provider control plane, but that are unmodified by the various API server instances. In this way, tenants and platform users of the tenants can interface with the cloud provider control plane 102 in a common way, such as through the one or more cluster APIs, while allowing the cluster control plane engine to generate instances of a modified API server that rely on modifications of the platform API to provide for multi-tenant operation. Platform users interacting with the computing platform through the platform API can be associated with a tenant. The cluster control plane engine can maintain one or more instances of an API server configured for processing requests sent to the computing platform by platform users of a respective tenant. The instances can form part of a cluster control plane specific for handling incoming requests from each tenant. A cluster control plane engine can execute multiple cluster control planes in parallel, each cluster control plane distinct from the cloud provider control plane 102 exposing the resources of the computing platform.

The cluster control plane engine can receive a request from a tenant to modify the state of computing resources assigned to the tenant as part of a cluster. The cluster control plane engine can determine whether a current cluster control plane is active for the requesting tenant, such as if one or more instances of an API server are executing for a current tenant. If a cluster control plane is active, then at least one API server instance is running on one or more threads of a process. If a cluster control plane is not running, then there are no API server instances currently executing for the tenant. In addition to the API server instances, a cluster control plane can include configuration data specifying characteristics of the tenant, including parameters for how the API server instance for the tenant should execute, as described herein.

If a cluster control plane is not active, the cluster control plane engine can spawn one or more threads that execute an API server instance corresponding to the requesting tenant. The API server instance is implemented on the computing platform and configured to process incoming requests formed according to a platform API. The API server instance is modified relative to a master copy of API server software. The modifications are not particular to the tenants sending API requests and can be made ahead of time and compiled for quick execution. When an API instance for a tenant is needed, a cluster control plane engine for the cloud provider control plane 102 can cause one or more threads to spawn that execute pre-compiled modified API server software corresponding to the requesting tenant.

The master API server software can be obtained from a computing platform that was not originally designed for multi-tenant operation, such as receiving API requests from different tenants with different parameters for communicating with the platform in a manner that mitigates or prevents service interruption between different tenants. A computing platform not originally designed for multi-tenant operation can be modified according to aspects of this disclosure to enable multi-tenant operation but without incurring marginal computing resource cost per added tenant. The cloud provider control plane 102 can effectively handle multiple cluster control planes for multiple tenants, on an allocation of resources relative to the overall needs of the cluster control plane engine to service incoming requests for multiple tenants.

The allocation of computing resources to operate the cloud provider control plane 102 is relative to the number of incoming API requests from various tenants of the computing platform, and not relative to the number of tenants themselves. The allocation can be scaled up or down as a function of this requirement to service requests in the aggregate, but the platform does not need to scale computing resources for each additional tenant. In some implementations, the allocation is fixed. However the platform allocates the cluster control plane nodes for implementing the cluster control plane engine 100, the platform 105 can preserve isolation between the tenants as described according to aspects of the following disclosure.

This isolation is at least partly due to cluster control plane engines of the cloud provider control plane 102 being configured to maintain multiple API server instances as separate threads of one or more processes. Rather than maintain each cluster control plane for multiple tenants as separate processes or on separate nodes of the platform, the cluster control plane engines of the cloud provider control plane 102 can monitor, spawn, execute, and destroy threads on-demand and according to incoming requests. In other words, the cloud provider control plane can maintain cluster control planes as-needed for current requests from different tenants to modify the state of the one or more clusters containing the respective computing resources assigned for each tenant.

For example, if there are no incoming requests to modify the state of a cluster corresponding to the tenant, then the cluster control plane for the tenant will have zero API server instances executing. Later, the tenant may begin to send requests to the platform, such as by platform users corresponding to the tenant. In response, and as described herein, the cloud provider control plane can cause one or more API server instances to execute, which are modified in accordance to requirements for servicing the particular tenant. When the tenant stops sending requests after a predetermined period of time, such as two minutes, the cloud provider control plane can destroy the threads executing the one or more API server instances, until the computing platform begins to receive new requests.

If one or more instances of a cluster control plane for a given tenant are idle for a period of time, the cloud provider control plane can destroy the threads corresponding to the idle instances, and make computing resources of the one or more nodes executing the cloud provider control plane available for other tenants. Further, the addition or reduction of tenants does not require adding or reducing computing resources, such as RAM, processing cycles, assigned to the node(s) implementing the cloud provider control plane. Additionally, the additional resource consumption to service additional tenants is tied to the nature and volume of requests of the tenants themselves. For tenants that do not send many requests to the computing platform, the amount of wasted computing resources allocated to the tenants can be reduced, at least because resources are only allocated to respond to requests, and then can be deallocated later to be used elsewhere.

A thread can be a conventional operating system thread executing one or more programming instructions as part of a process. The cluster control plane engines of the cloud provider control plane can also implement modified threads executed above the operating system level of a node executing the cluster control plane engines. These types of threads, referred to as "software threads" can include user-level threads. Software threads can also refer to threads configured to communicate data across one or more channels. A channel is a data structure maintained by a cluster control plane engine for storing data of a particular type communicated between threads. Software threads communicating through channels can be scheduled programmatically by the cloud provider control plane to mitigate blocking behavior, in a manner similar to threads generated at the operating system level, such as a kernel-level thread. In addition, the cluster control plane engine can be configured to spawn a single operating system thread—one for each cluster control plane—that executes one or more software threads. An example of such software threads are goroutines in the Go programming language.

The cloud provider control plane can create and execute cluster control planes through the coordinated spawning and destruction of threads across one or more cluster control plane engines, in response to incoming requests to modify the state of a multi-tenant cluster. At the same time, the cloud provider control plane can also manage immutable data common to each running API server instance in a shared cache. The immutable data prevents modification of data unique to one running API server instance from being changed by another running API server instance. The shared cache can additionally reduce the amount of total memory needed to run the cloud provider control plane versus conventional approaches in which each cluster control plane is run on a separate node. This immutability and other functions described in this specification can help the cloud provider control plane to enforce isolation as between each tenant, while still being memory-efficient.

From the perspective of a sender sending a request to the cloud provider control plane, the cloud provider control plane appears and can be interacted with as a dedicated API server, despite the cloud provider control plane running separate instances of a master API server. This abstraction can allow the cloud provider control plane as described herein to be implemented more easily on existing cloud platforms already implementing an API server for a platform API, at least because the cloud provider control plane can be hooked into the platform and communicated with according to an existing protocol for receiving and responding to the API server.

Example Systems and Methods

FIG. 1 is a block diagram of an example cloud computing platform implementing a cluster control plane engine 100 according to aspects of this disclosure. As described herein, the cloud provider control plane 102 can operate the cluster control plane engine 100 and enact API requests on the engine 100, as described herein. The cluster control plane engine 100 can operate one or more cluster control planes, each plane corresponding to a particular tenant. The cluster control plane can include one or more modified instances of API software, offering a modified API for getting controllers of the computing platform to drive aspects of the cloud provider control plane 102.

User computing device 120 is communicatively coupled to a computing platform 105 through a network 125. The user computing device 120 can be any one of a variety of devices, such as a laptop, desktop computer, a mobile device like a phone or a tablet, or a device intended to be worn, such as a watch, earbuds, glasses, or a helmet. One or more user computing device(s) can also communicate with the cloud 105 and/or one or more computing platforms 116, either in sequence, concurrently, or some combination of the foregoing.

For ease of description, reference will be made to the user computing 120 as interacting with the computing platform 105. It should be appreciated that a typical computing platform can include a large number of connected server computing devices, many storage devices, and/or many datacenters located at one or more physical sites or locations.

The platform 105 can be provided for and maintained by a cloud provider. A cloud provider can be an individual or an organization of individuals. The maintenance of the platform 105 is at least partially automated by appropriately configured software and/or hardware. Platform users can be individuals, organizations having more than one individual, and/or at least partially automated software and/or hardware configured to communicate with the computing platform 105. In general, platform users interact with the computing platform 105 through the user computing devices 120, 121. Platform users can interact directly with the platform 105, for example through a user interface or an API.

In some implementations, platform users can also interact with the cloud platform 105 using one or more programs or other techniques for automating interactions between the platform 105 and a device executing the one or more programs or techniques. In those implementations, the device can act with credentials corresponding to a platform user. For example, from the perspective of the computing platform 105 and the worker nodes corresponding to the tenant for the platform user, the device appears to be operated directly by the platform user whose credentials are being used.

The platform 105 can provide a suite of services and applications for providing the necessary resource for a platform user to develop and host their own application or services, sometimes at monetary cost. An application can be a collection of services and supporting software, such as a web server hosting a website, receiving and transmitting information according to a specific protocol, such as HTTP. A service can be a specialized program that performs one or more operations as part of a running application. For example, a service for a mail server can be a service for reading incoming mail according to a particular protocol, such as POP3 or IMAP.

The computing platform 105 is configured to provision a tenant with one or more user-accessible worker nodes. A user-accessible worker node can be a node provisioned to the tenant, and accessible by platform users corresponding to the tenant. A tenant represents one or more platform users, one or more worker nodes assigned to the tenant, one or more policies for how the one or more platform users may interact with the cloud provider and one or more worker nodes. A cluster can include a plurality of worker nodes, and some cluster control plane. A cluster control plane may be implemented on one or more discrete control plane nodes, which may be part of an aggregated service provided by the cluster control plane engine 100, as described herein. A node can operate containers or pods of containers. A node is a discrete unit of physical or virtual computing resources assigned to perform a service or application.

As described herein, each tenant corresponds to a cluster control plane managed by the cluster control plane engine 100. The cluster control plane engine 100 can be implemented on one or more cluster control plane nodes, which can be reserved by the computing platform 105 for executing the cluster control plane engine 100. Alternatively, the cluster control plane engine 100 can be implemented by directly running on computing resources of the platform 105, without dividing the resources into virtualized nodes.

As a physical computing resource, a node can include one or more processors and/or one or more storage devices of one or more server computing devices 112, 115 across one or more datacenters of the computing platform 105. As a virtual computing resource, a node can include one or more virtual machines, each virtual machine operating using physical processors and storage devices of the computing platform 105. The virtual machine can provide a level of abstraction between physical computing resources and the platform user, and multiple virtual machines for different platform users can operate on shared physical computing resources. From the perspective of the platform user, however, the node can appear as a dedicated physical set of hardware, such as if the platform user were executing applications or other programs directly on the hardware.

The computing platform 105 can provide an interface between the tenant and the computing platform 105. The interface can be implemented in a number of ways. For example, the computing platform 105 can implement a user interface that is displayed on a display connected to the user computing device 120.

The computing platform 105 can also provide a platform API to allow for programmatic communication between the user computing devices 120, 121 and the computing platform 105, such as using software written in accordance with the platform API. A platform API is a set of functions that define specific interactions between the computing platform 105 and the user computing device 120, 121, and/or other devices that are communicatively coupled to the computing platform 105. In general, the platform API includes a set of functions for modifying the state of one or more clusters of nodes assigned and maintained by the platform 105. The platform API can include one or more distinct APIs for performing different functions, as described in more detail herein.

A state of a cluster can refer to the data processed and data stored on the cluster, as well current applications or services operating on the cluster, such as in containers or pods of containers. The platform API can define functions for modifying what data is stored, what data is processed, and under what conditions data is processed for a given cluster. As described in more detail, below, the platform 105 can implement instances of an API server configured to execute state modifications of a cluster according to API requests received by the cluster control plane engine 100.

In some implementations, the platform API can refer to more than one API associated with the platform 105. Each API can correspond to a set of functions that can be generally categorized as defining a specific type of operation on the platform 105. For example, one API can include functions for sending a request to the platform 105 to request a new tenant be added. The API can also include functions and parameters for specifying different characteristics for the new tenant, such as the platform users to be associated with the tenant, and/or an initial allocation request for one or more worker nodes.

As an example, functions defined by the platform API for executing state modifications and/or reading the state of a cluster according to API requests can be abstracted as one or more cluster APIs. The functions defined for modifying the state of a cluster for a tenant can be grouped as part of one or more cluster APIs. A cluster API can define functions that can be invoked by services and/or applications executed by different platform users of the platform 105. To prevent modifications to the platform API as a whole from interrupting services and/or applications relying on the API, the platform API can define separate APIs like the cluster API that can be left unchanged even as other APIs are modified.

Platform users and tenants can form API requests according to the cluster API(s). The API requests can be received and routed to a respective cluster control plane engine implementing a respective API server instance. The API server instance can be modified to execute a modified or different set of APIs from the APIs that can originally defined by the platform API for the computing platform configured for single tenant operation, but be configured to translate the API request and perform one or more operations for servicing the request. The platform API may specify requests in an imperative fashion, while the API server instances to which the API request is routed can be configured to execute one or more operations in a declarative fashion. In other words, the API request can specify a modification to a current state of a cluster, while the computing platform translates the API request into one or more operations for performing the modification specified by the API request.

Another example of an API can include functions for how certain applications or services are executed on the worker nodes of a tenant. The API can also include functions and parameters for specifying how many instances of a given application or service should be executed on the worker nodes, and how much of allocated computing resources to the tenant should be dedicated to executing the given application or service. In some implementations, parameters that can be user-defined can also be predetermined and automatically applied when not provided. For example, the computing platform 105 can receive a request defined by the platform API for launching a new instance for a given application, and can automatically provide parameter values for computing resources to allocate for executing the given application.

In some implementations, the computing platform 105 can be configured to assign a tenant to a cluster with zero worker nodes. One reason for doing this can be because the platform users associated with the tenant may want to access other types of resources available on the computing platform 105, besides physical or virtualized computing resources available for a tenant to run their own applications or services. For example, platform users for a tenant may wish to leverage an existing application or service provided by the computing platform 105 and exposed by the platform API, such as virtualized storage devices, network routing devices, specialized hardware such as graphic processing units (GPUs) or tensor processing units (TPUs), or a domain name system (DNS) managed by the platform 105.

The computing platform 105 includes a datacenter 110, and in some implementations one or more additional datacenters 114. The datacenters 110, 114 can be at one or more physical locations and house physical hardware for executing the various applications and services available to platform users of the computing platform 105. The datacenter 110 can include a server computing device 115, and optionally one or more other server computing devices 112.

The devices 112, 115, 120, and 121 can be capable of direct and indirect communication over the network 125.

For example, using a network socket, the user computing device 120 can connect to a service operating on the server computing device 115 through an Internet protocol. The server computing device 115 can set up listening sockets that may accept an initiating connection for sending and receiving information. The network 125 itself can include various configurations and protocols including the Internet, World Wide Web, intranets, virtual private networks, wide area networks, local networks, and private networks using communication protocols proprietary to one or more companies. The network 125 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 125, in addition or alternatively, can also support wired connections between the devices 112, 115, 120, and 121, including over various types of Ethernet connection.

The server computing device 115 can implement the cluster control plane engine 100. As described in more detail, below, the cluster control plane engine 100 is configured to maintain cluster control planes, each cluster control plane corresponding to one or more worker nodes assigned to a tenant. The cluster control plane engine 100 itself can be implemented on one or more cluster control plane nodes separately allocated by the computing platform 105. In some implementations, the cluster control plane engine 100 can be directly implemented on the server computing device 115, without generating cluster control plane nodes.

Figure 2:
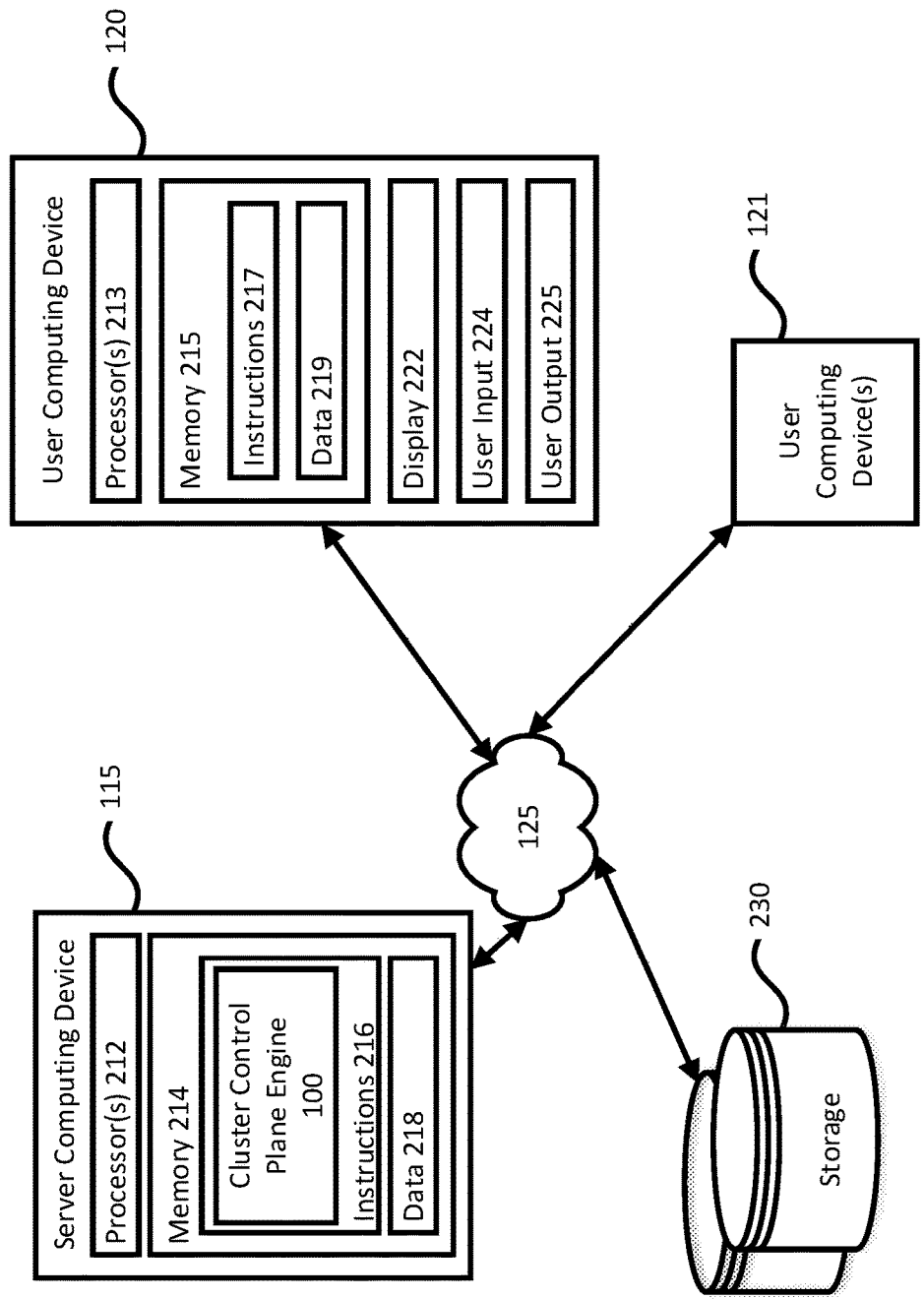
FIG. 2 is a block diagram of the user computing devices and the server computing device implementing the cloud provider control plane.

FIG. 2 is a block diagram of the user computing devices 120, 121 and the server computing device 115 implementing the cluster control plane engine 100. The user computing devices 120, 121 and the server computing device 115 can be communicatively coupled to one or more storage devices 230. The storage device(s) 230 can form at least part of computing resources available to various worker nodes assigned to different tenants. The storage device(s) 230 can be a combination of volatile and non-volatile memory, and can be at the same or different physical locations than the server computing devices 115, 112.

For example, the storage device(s) 230 can include one or more persistent discs for maintaining records of states of various clusters on the computing platform 105. The storage device(s) 230 can also store data and metadata relating to clusters assigned to different platform users, as well as data for configurations unique to clusters assigned to the various platform users. For example, the storage device(s) 230 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 115 can include one or more processors 212 and memory 214. The memory 214 can store information accessible by the processor(s) 212, including instructions 216 that can be executed by the processors 212. The memory 214 can also include data 218 that can be retrieved, manipulated or stored by the processor(s) 212. The memory 214 can be a type of non-transitory computer readable medium capable of storing information accessible by the processors 212, such as volatile and non-volatile memory. The processor(s) 212 can include one or more central processing units (CPUs), graphic processing units (GPUs), field-programmable gate arrays (FGPAs), and/or application-specific integrated circuits (ASICs), such as tensor processing units (TPUs).

The instructions 216 can be one or more instructions that when executed by one or more processors of the computing platform 105, causes the one or more processors to perform actions defined by the instructions. The instructions 216 can be stored in object code format for direct processing by the processors 212, or other in other formats including interpretable scripts or collections of independent source code modules that are interpreted on demand or compiled in advance. The instructions 216 include instructions for executing the cluster control plane engine 100 consistent with aspects of this disclosure. The cluster control plane engine 100 can be executed using the processor(s) 212, and/or using other processors remotely located from the server computing device 115.

The data 218 can be retrieved, stored or modified by the processors 212 in accordance with the instructions 216. The data 218 can be stored in computer registers, in a relational or non-relational database as a table having a plurality of different fields and records, or as JSON, YAML, proto, or XML documents. The data 218 can also be formatted in a computer-readable format such as, but not limited to, binary values, ASCII or Unicode. Moreover, the data 218 can include information sufficient to identify relevant information, such as numbers, descriptive text, proprietary codes, pointers, references to data stored in other memories, including other network locations, or information that is used by a function to calculate relevant data.

The user computing device 120 can also be configured similar to the server computing device 115, with one or more processors 213, memory 215, instructions 217, and data 219. The user computing device 120 can also include a user output 222, and a user input 224. The user input 224 can include any appropriate mechanism or technique for receiving input from a user, such as keyboard, mouse, mechanical actuators, soft actuators, touchscreens, microphones, and sensors.

The user computing device 120 can also include a user output 225. The server computing device 115 can be configured to transmit data to the user computing device 120, and the user computing device 120 can be configured to display at least a portion of the received data on a display implemented as part of the user output 225. The user output 225 can also be used for displaying an interface between the user computing device 120 and the server computing device 115. The user output 225 can alternatively or additionally include one or more speakers, transducers or other audio outputs, a haptic interface or other tactile feedback that provides non-visual and non-audible information to the platform user of the user computing device 120.

Although FIG. 2 illustrates the processors 212, 213 and the memories 214, 215 as being within the computing devices 115, 120, components described in this specification, including the processors 212, 213 and the memories 214, 215 can include multiple processors and memories that can operate in different physical locations and not within the same computing device. For example, some of the instructions 216, 217 and the data 218, 219 can be stored on a removable SD card and others within a read-only computer chip. Some or all of the instructions and data can be stored in a location physically remote from, yet still accessible by, the processors 212, 213. Similarly, the processors 212, 213 can include a collection of processors that can perform concurrent and/or sequential operation. The computing devices 115, 120 can each include one or more internal clocks providing timing information, which can be used for time measurement for operations and programs run by the computing devices 115, 120.

Figure 3:
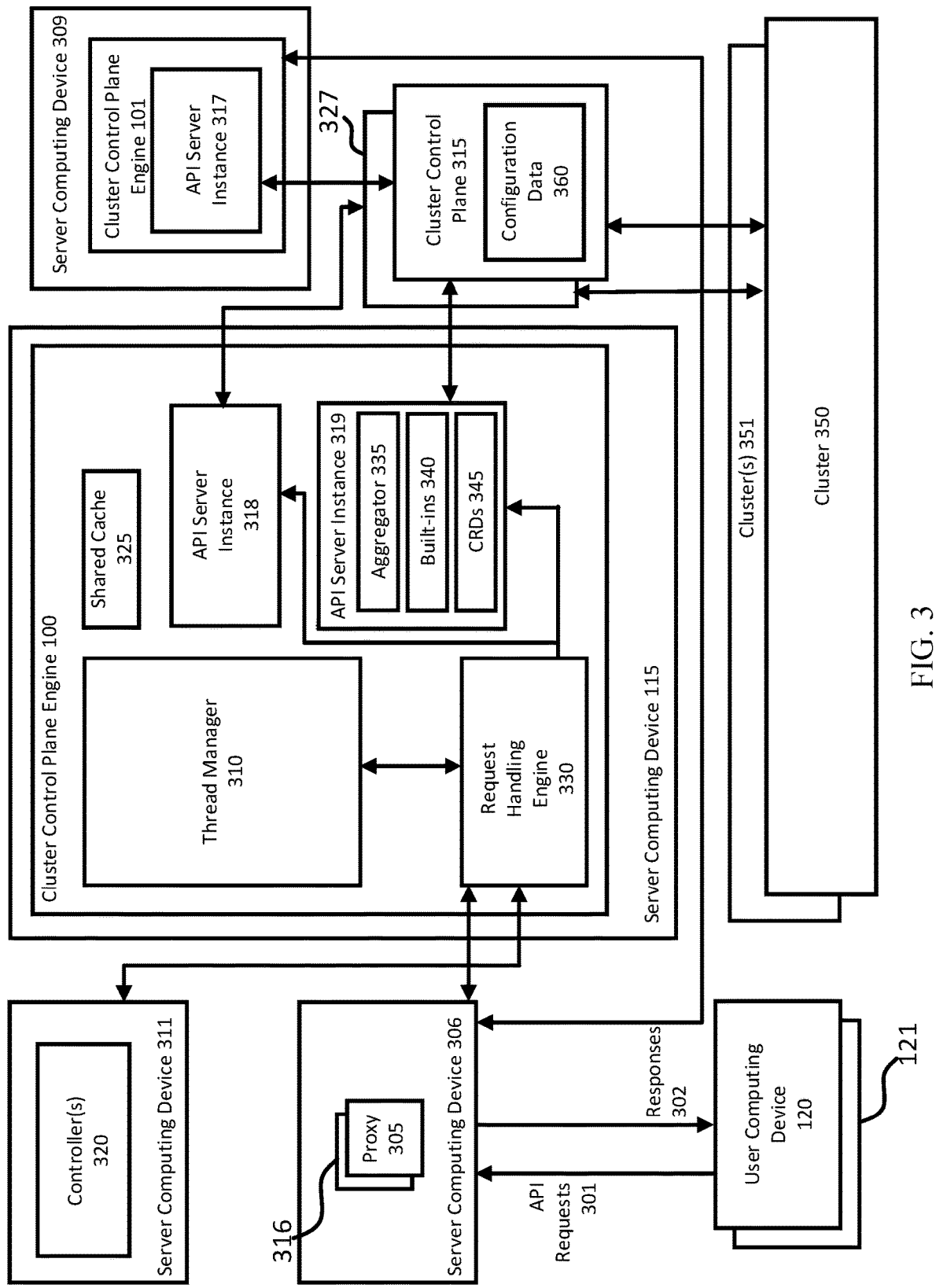
FIG. 3 is a block diagram of the cluster control plane engine receiving and processing requests from the user computing device.

FIG. 3 is a block diagram of the cluster control plane engine 100 receiving and processing requests 301 from the user computing device 120. In general, the cluster control plane engine 100 can include a cluster control plane 315, and one or more additional cluster control planes 327. The cluster control plane 315 can be configured to process API requests for modifying the state of cluster 350 and optionally one or more additional clusters 351.

The cluster control plane engine 100 can be implemented on one or more physical or virtualized nodes. In some implementations, the cluster control plane engine 100 can be implemented directly on computing resources of one or more computing devices, for example by one or more processors of a computing device configured to implement the cluster control plane engine 100 as described herein.

The computing platform 105 can be configured to implement one or more instances of the cluster control plane engine 100, such as the cluster control plane engine 100 and the cluster control plane engine 101. The computing platform 105 can implement multiple instances of the cluster control plane engine 100 in response traffic patterns, such as an increase of API requests 301 over a short period of time. The computing platform 105 can also implement multiple instances of the cluster control plane engine 100 in response to general usage behavior and demand of platform users of tenants serviced by the computing platform 105.

The cluster control plane engines 100, 101, can be implemented on separate server computing devices, such as shown in FIG. 3 with the cluster control plane engine 100 on the server computing device 115 and the cluster control plane engine 101 on server computing device 309. Although shown on different devices, in some implementations multiple instances of the cluster control plane engine can be implemented on the same node or computing resources.

The cluster control plane engines 100, 101 can manage the same or different tenants. For example, and as shown in FIG. 3, the cluster control plane engine 100 can include an API server instance 319 that is part of cluster control plane 315. The cluster control plane engine 101 can include an API server instance 317 that is also part of the cluster control plane 315. Different cluster control plane engines of the cloud provider control plane 102 may execute multiple API server instances for different cluster control planes in response to the increase or decrease of incoming API requests to the platform 105.

The user computing device 120 can send API requests 301 to a proxy 305 and optionally one or more additional proxies 316. The proxies 305, 316 can be implemented on the same or different computing resources as each proxy, and/or relative to the cluster control plane engine 100. For example, in FIG. 3, the proxies 305, 316 are implemented on server computing device 306 which can be part of the computing platform 105. The proxies 305, 316 are configured to receive the incoming API requests 301 from the user computing devices 120, 121, and forward the API request to an available cluster control plane engine with capacity to handle the API request. The proxy 305 may receive an API request from a platform user corresponding to a tenant that is associated with the platform 105 with the cluster control plane 315. In response, the proxy 305 can send the API request either to the cluster control plane engine 100 or the cluster control plane engine 101, because both planes 100, 101 can perform actions on behalf of the tenant and/or the platform user of a tenant.

As another example, the proxy 305 can receive an API request that identifies a tenant associated with cluster control plane 315. The cluster control plane 315 at the time the API request is received may only have one API server instance 318, executing on the cluster control plane engine 100. Therefore, the proxy 305 can forward the API request to the cluster control plane engine 100.

The proxy 305 may receive the API requests 301 at a rate that cannot be serviced by the cluster control plane engine 100, 101, without scaling resources available to the planes 100, 101. The proxy 305 can cause the cloud provider control plane 102 to implement additional instances of the cluster control plane engine to handle the increased rate at which requests are received. At a later time, the proxy 305 can send an indication to the platform 105 that the rate of API requests has slowed. In response, the computing platform 105 can eliminate additional instances of the cluster control plane engine.

The API requests 301 can include data and metadata, which can correspond to configuration data for modifying or reading the state of a cluster corresponding to a tenant identified in the API request 301, and/or configuration data for the cluster control plane of the tenant in general. The API request 301 can also specify actions to be performed to modify or read the state of clusters 350, 351, for example the state of worker nodes, containers or pods of containers thereon, or other cluster configuration data stored in the cluster control plane.

Configuration data specified by the API requests 301 can include values for one or more attributes maintained by the cloud computing platform 105 for different nodes, pods, the clusters 350, 351 and/or the cluster control plane 315 itself, as described herein. Tenants may be assigned computing resources across one or more clusters of the platform 105.

Configuration data 360 of the cluster control plane 315 can be modified or read in accordance with configuration data specified in the API requests 301. The configuration data 360 can be represented and stored as one or more data objects or data structures in the cluster control plane 315. The configuration data 360 can include information about and settings for the cluster control plane 315, and/or of the clusters 350, 351, as well as nodes, containers, load balancers, virtual storage devices and/or pods of the clusters 350, 351. Together, the configuration data 360 defines the state of the cluster. The configuration data 360 can be stored in persistent memory accessible to the computing platform 105, such as in memory coupled to the server computing device 115 or the server computing device 309.

The configuration data 360 can specify the types of applications or other workloads running on nodes of the cluster. For example, the state can define what applications are running, versions of the applications running, and how many containers executing instances of an application are running. For example, the configuration data 360 information about services provided to the clusters 350, 351, by the computing platform 105, such as load-balancing by one or more load balancers. The configuration data 360 can also include instructions, rules, and/or parameters for how to interact with the clusters 350, 351. These can include instructions to a controller for automatically increasing or decreasing the number of pods managed by the cluster control plane 315, for example in response to increases or decreases in API requests to the cluster control plane 315.

In general, the API requests 301 can specify configuration data for modifying the state of the clusters 350, 351, in accordance with configuration data of the cluster control plane 315. In this specification, API requests specifying configuration data for modification of nodes, pods, clusters, and/or a cluster control plane for a cluster are referred to in this specification generally as requests to modify the state of a given cluster or clusters. The state of the cluster can refer to characteristics of the cluster such as the hardware running as part of nodes of the cluster, as well as the software running on nodes of the cluster and platform resources allocated on behalf of the cluster, such as load balancers, virtual storage devices, or managed databases.

Modifications to the state can include a change in the software version for the applications running, a change in the amount of instances running and on how many containers, and/or other configuration settings. The API request 301 can include configuration files (sometimes referred to as "manifests") that specify a desired state for the cluster 350, or a desired state for computing platform resources which controllers 320 can work to bring about, as described here.

The API requests 301 can include identifiers, such as resource identifiers identifying the one or more target resources, such as according to hostname, URL path prefix on a network, or some other attribute that the cluster control plane engine 100 is configured to process to determine what configuration data to change for the cluster control plane 315 in response to configuration data specified in the API requests 301. Example resources include: nodes, containers, load balancers, virtual storage devices and/or pods of clusters associated with the tenant. For example, the API requests 301 can include identifiers identifying the origin of the request, such as a tenant ID. The resource identifiers can correspond to names provided to one or more resources assigned to a tenant making the API request 301, for example. Resource identifiers can include sub-identifiers to identify containers or pods of containers within an identified resource. Example resources include The cluster control plane engine 100 can send a response 302 to the user computing device 120 in response to the successful or unsuccessful processing of the API requests 301. The response 302 can be an indication to the user computing device 120 that the changes to the state of a cluster. In the event of failure, the response 302 can include a list or some other representation of errors or reasons why the API request 301 could not be completed.

In some cases, the API requests 301 can include requests to read the configuration data 360. In those cases, the state of the cluster may not be modified, but one or more controllers can be configured to monitor the cluster to maintain the current state of the cluster as described in more detail, below.

The proxies 305, 316 can be configured to authenticate the API request 301, such as, to verify that the API request 301 correctly identifies a user computing device or other entity with proper authorization to send API requests to the computing platform 105. Proper authorization can refer to credentials for authenticating an entity such as a platform user, a device operated by the user, and/or an automated program such as a controller operating on behalf of the platform user. Proper authorization can include an authorized service account representing an entity sending the API request. For example, the proxy 305 can determine that the platform user, device, and/or automated program has proper credentials for sending an API request, and in response pass the API request through the cluster control plane engine 100. The proxy 305 can also be configured to act as a load balancer. The proxy 305 can identify, for the API request 301, a cluster control plane specified in the API request 301. The proxy 305 can pass the API request 301 with an indication of the identified cluster control plane to the thread manager 310.

The thread manager 310 can receive an API request to modify or read the state of a cluster for one or more target nodes. The thread manager 310 can receive the API requests 301 from the proxies 305, 316, which as described above can be configured to authenticate the API requests 301 and to identify the requesting tenant.

As described herein, the cluster control plane 315 can include zero or more API server instances, such as the API server instances 319, 317. The API server instances 319, 317 can be executed as one or more respective threads spawned by the thread manager 310. The thread manager 310 is configured to spawn, manage, and destroy threads. A cluster control plane may include zero API server instances for example when there are no incoming API requests for a tenant corresponding to that cluster control plane after a predetermined period of time, such as 2 minutes.

A thread in this specification can refer to an operating system thread or a software thread. Both types of threads can be configured to execute one or more instructions of a process. A process refers to an execution of a computer program by one or more nodes of the computing platform 105.

Software threads, such as user-level threads, can concurrently execute one or more programming instructions and are generally easier to generate and switch between than operating system threads, which run at the kernel or operating system level of a node executing a process. Software threads can be programmatically generated, such as using a programming language configured for concurrent programming Multiple software threads can run as part of a single operating system thread. As described below, the cluster control plane engine 100 can spawn multiple software threads on a single operating system thread to execute a cluster control plane for a requesting tenant.

The spawned threads can run concurrently and share memory. As a result, it is possible for the threads to run into concurrency issues, such as by trying to read/write to data in the same location in memory at the same time. Operating system threads can include kernel-level threads and software threads can include user-level threads that can both behave differently when a concurrency issue arises. A kernel-level thread can be switched, for example by the operating system, to another kernel-level thread, when the kernel-level is "blocked," e.g., cannot access a location in memory because another thread is currently writing to that location.

The thread manager 310 can spawn one or more threads to execute API server instances for each cluster control plane 315 and 327. Threads in general are much cheaper and easier to spawn or destroy relative to processes. As the number of tenants accessing the clusters 350, 351 expands or contracts, the thread manager 310 can adaptively spawn or destroy threads corresponding to more or fewer API server instances for different cluster control planes. Rather than maintain dedicated computing resources for each cluster control plane, the thread manager 310 can destroy software threads executing API server instances for idle cluster control planes, and then later spawn new threads as needed. If threads for all of the API server instances for a cluster control plane are destroyed, then the corresponding cluster control plane is dormant until further requests cause additional API server instances to be spawned, as described herein. The platform 105 can store configuration data for the cluster control plane to use as part of executing API server instances for a new cluster control plane for a tenant as requests from the tenant are received.

Spawning and destroying threads for multiple API server instances is generally less computationally expensive than dedicating separate pluralities of cluster control plane nodes for each cluster control plane needed to process incoming API requests from different tenants. One reason is because the thread manager 310 can spawn and destroy threads on-demand, meaning that when a tenant is not currently sending API requests within a predetermined idle period, such as two minutes, then the thread manager 310 destroys the threads and allows new threads to execute in their place to service active tenants, instead. When an incoming API request targets nodes for a tenant whose cluster control plane was previously destroyed for being idle, the thread manager 310 can spawn new threads to execute new API server instances for a cluster control plane for the tenant. From the perspective of the platform user, the cluster control plane is always available. However, if the tenant for the platform user is idle, then none of the cluster control plane engines 100, 101 may be executing API server instances for the cluster control plane. Instead, the resources are freed to be used to execute API server instances for cluster control planes of other tenants.

There can be zero or little marginal cost associated with running additional API server instances for each added tenant on the platform 105. The marginal cost can refer to computing resources associated with servicing additional tenants of the platform 105. Because threads are spawned on-demand, the platform 105 does not waste idle resources in anticipation of API requests by platform users for a given tenant. In conventional systems, a platform implementing multi-tenancy may allocate a fixed minimum amount of computing resources, such as one to three cluster control plane nodes, to implement a respective cluster control plane for each tenant. For smaller tenants, this fixed minimum is often wasted, at least because the traffic of API requests and responses sent to and from cluster control plane nodes implementing a cluster control plane for a smaller tenant does not often require the fixed minimum allocation given by the platform. Further, a tenant under-utilizes computing resources for executing a respective cluster control plane when it stands idle. Further, in the case where cluster control planes for different tenants could otherwise safely share storage or effort between each other, being located on separate control plane nodes prevents such sharing. Being able to safely store data between cluster control planes can include the ability to store immutable data for one cluster control plane, such that the data cannot be modified by another cluster control plane.

The one or more spawned threads can include an operating system thread that executes a plurality of software threads. Software threads can be cheaply generated, for example 200,000 threads or more per process executing the threads. The cluster control plane engine 100 can implement software threads with special properties for mitigating blocks caused by concurrency issues during execution of the separate threads. For example, the software threads can be configured to communicate data across one or more channels. A channel is a data structure configured to store data communicated between threads. A channel can be configured to accept or transmit data of a particular type. Some threads can be configured to send data of that type into a channel, while other channels are configured to read data of that type from the channel.

The thread manager 310 can take advantage of inexpensive software threads while still maintaining a flexibility in responding to blocking behavior in a manner more commonly associated with operating system threads, particularly kernel-level threads. For example, the platform 105 can be configured to spawn and execute software threads as goroutines in the Go programming language, which can include scheduling the execution of the different goroutines.

The thread manager 310 may determine that a cluster control plane does not exist for nodes, pods, or clusters whose configuration data to be modified is specified in an API request for a target node. This may happen, for example, because the tenant was idle for more than a predetermined period of time. In response, the thread manager 310 can destroy threads for executing an existing cluster control plane that was used previously for responding to the API request 301 from a platform user of the idle tenant. The thread manager 310 can spawn one or more threads for executing a cluster control plane and modifying the state of the cluster as specified in the API request. As part of doing so, the cluster control plane can generate a new API server instance. Generation of the API server instance is described in more detail, below.

The cluster control plane engine 100 can be implemented as a single process or as multiple processes concurrently. The number of processes the cluster control plane engine 100 is implemented as depends on the nature of the hardware implementing the cluster control plane engine 100. The number of processes can depend, for example, on the capability of the underlying hardware executing the cluster control plane engine 100 to run multiple processes concurrently. It is worth noting that once the number of processes and computing resources are allocated to the process or processes, the total allocation to executing the cluster control plane engine 100 according to aspects of this disclosure does not vary with the number of tenants being serviced. Instead, the computing resources allocated to the cluster control plane engine 100 can vary in proportion to the number of API requests received. The cluster control plane engine 100 in general requires fewer additional computing resources for processing more requests than what is required for managing additional tenants, at least because of fixed costs associated with managing an additional tenant, as described herein.

The request handling engine 330 can receive the API requests 301 forwarded by the proxies 305, 316. The request handling engine 330 can forward API requests to appropriate instances whose tenants are identified in the requests. The request handling engine 330 can determine whether the current number of API server instances executed by the cluster control plane engine 100 can handle the incoming requests. The request handling engine 330 can communicate with the thread manager 310 to cause the thread manager 310 to spawn or destroy threads for additional or fewer API server instances, in response to the rate at which API requests are received.

The computing platform 105 is configured to determine whether a controller of the controller(s) 320 is available to perform modifications to the state of a cluster specified in an API request to service the API request 301. The controller(s) 320 can be implemented on the same or different server computing device as the cluster control plane engine. As shown in FIG. 3, the controller(s) 320 are implemented on a server computing device 311. However, it is understood that in general each controller can be implemented on one or more devices in one or more locations and coupled to the computing platform 105.

One or more controllers can be responsible for actuating a cluster control plane for a given tenant. In this example, the API request 301 can come from a platform user of a particular tenant. If the computing platform 105 determines that a controller is available and is monitoring the state of the cluster corresponding to a cluster control plane. The monitoring controller can perform one or more actions to cause the cluster being monitored by the controller to be modified in accordance with the API request 301, as described herein. After making the necessary modifications, status information for the current state of the cluster, such as the state of resources modified by the controller, can be written back to the cluster control plane corresponding to the particular tenant from which the API request 301 originated.

The controller(s) 320 can be configured to watch the current state of the clusters 350, 351, and cause the state of a cluster to change in accordance with the API request 301. The controller(s) 320 can operate as control loops for monitoring some or all characteristics of the clusters 350, 351 corresponding to its state, such as the number of applications running, the version of each application, how many containers are running, etc. The controller(s) 320 can operate to cause the clusters 350, 351 to operate to a desired state in accordance with the API request 301. To do so, the controller(s) 320 can perform a variety of different functions, for example initializing nodes with available computing resources, managing nodes present in the clusters 350, 351, and/or generating or destroying containers running different applications.

For example, the API request 301 can include a manifest specifying that three containers run replicas of a particular application on nodes in the cluster 350. At least one controller of the controller(s) 320 can monitor the cluster 350. If the controller detects that one of the three containers has crashed, the controller can consult the latest manifest for the cluster 350 and perform actions to bring the current state of the cluster 350 to the desired state specified in the manifest, such as generating a new container running the application as a replacement for the crashed container.

The controller(s) 320 may be configured to perform specific tasks, for example as cloud controllers or API controllers. The different controllers can correspond to different components of the API server instance 319. For example, cloud controllers manage cloud-specific control logic, allowing the clusters 350, 351, to link to the API server instance 319 to perform platform API-defined functions. API controllers can be configured for executing the called platform API functions from the clusters 350, 351.

As part of executing the called platform API functions, API controllers can be configured to perform one or more operations corresponding to the called API functions that are defined declaratively and whose corresponding operations to be performed are not specified by the invocation of the API function alone. For example, the platform API as described herein may include one or more APIs that are user-facing. A user-facing API may be defined declaratively. In response to receiving. On the other hand, API controllers of the controller(s) 320 may be configured to execute one or more imperative API function calls, in which the specific operations to be taken by the API controllers are specified. In some implementations, API controllers are configured to translate declarative function calls into one or more imperative function calls, and execute one or more operations corresponding to the imperative function calls.

The cluster control plane engine 100 can maintain a controller responsible for registering newly allocated nodes to an API instance. The worker nodes can be allocated to a new tenant, or added to worker nodes previously allocated to an existing tenant.

The controller(s) 320 can be maintained as a pool of controllers by the cluster control plane engine 100. The controller(s) 320 can monitor the states of clusters managed by the cluster control planes 315, 327 of the cluster control plane engine 100, as described herein. In addition, the controller(s) 320 can monitor the changes made by incoming API requests to the cluster control plane.

The cloud computing platform 105 can periodically monitor the controller(s) 320 to determine if any controllers are running idle for more than a predetermined period of time. In response, the cluster control plane engine 100 can un-assign the one or more controllers and return the controllers to the pool. As part of the un-assignment, the cloud computing platform 105 can destroy threads running the un-assigned controllers. In addition, the cloud computing platform 105 can also assign one or more controller(s) for monitoring a cluster, for example when threads for a new cluster control plane are spawned by the thread manager 310

In some implementations, the thread manager 310 does not destroy the threads executing the un-assigned controllers, but makes the threads available as controllers in a pool. In these implementations, the controller(s) can be repurposed to modify cluster states at different target nodes, without destroying and spawning new threads. For example, some API requests can come from different tenants with target nodes in the same cluster. Instead of destroying the threads executing the controller altogether, the thread manager 310 can cause the controller to modify the state of the cluster containing the respective nodes targeted in the different API requests.

The thread manager 310 can be configured to automatically destroy executing threads after an API request is processed, and the response 302 is generated. In some implementations, the thread manager 310 saves the data corresponding to the cluster control plane 315 and the API server instance 319 to memory for a predetermined period of time, and waits until that predetermined period of time elapses before destroying threads executing a controller that services the API request 301. The data saved can be data required by one or more later-spawned threads to begin executing the cluster control plane 315 with the API server instance 319. By waiting for a predetermined period of time, such as two minutes, the thread manager 310 can potentially save processing cycles by reducing the time needed to initialize the cluster control plane 315 and the API server instances 319, because the data to do so was saved to memory by the thread manager 310 previously.

As part of executing a cluster control plane for a tenant, the thread manager 310 is configured to generate an API server instance for the plane. The API server instance is a modified copy of API server software. The API server software refers to one or more services, such as part of one or more applications, implemented by the computing platform 105 for receiving and processing requests from user computing devices and according to the platform API.

In general, the API server software is configured with appropriate sub-routines, data structures, and software to facilitate communication between the user computing devices and the server computing devices of the computing platform 105. The computing platform 105 can maintain an original or master version of the software, and the cluster control plane engine 100 can deploy one or more API server instances as part of generating additional cluster control planes. For example, the cluster control plane engine 100 can fork the API server software, modify the forked copy as necessary, and deploy the forked and modified copy as a separate instance of the API server software. The modified copy can be compiled as one or more binary files and executed along with the thread manager 310. For example, the binaries for the modified API server instances can be included as part of the binary of the thread manager 310 in memory coupled to processors configured to execute the thread manager 310.

In general, the modifications of the API server software are modifications for facilitating thread-safe operation of cluster control planes for multiple tenants. An instance of the modified API server software can be executed as one or more threads by the cluster control plane engine 100 and can correspond to a particular tenant, for example when that tenant is sending API requests to be processed.

When the thread manager 310 spawns threads corresponding to a new API server instance for a cluster control plane, the thread manager 310 can copy the compiled modified server instance corresponding to the tenant, and execute the instance with one or more threads. The modified server instance can apply configuration data specified by the tenant, as described herein, to execute the API server software in accordance with modifications made to facilitate multi-tenant operation.

How the cluster control plane engine 100 can modify the API server instance 319 is described below. The modifications can be performed as part of adapting a pre-existing computing platform not currently configured for servicing more than one tenant. This type of pre-existing platform can be modified, in accordance with aspects of this disclosure. The modifications can include implementing a cluster control plane engine as described with reference to FIGS. 1 and 2. The modifications can also include modifying API server software implemented by the platform for handling functions defined by different APIs and exposing applications, services, and resources available to users of the platform, the modifications of which as described herein. As part of facilitating multi-tenant operation, the modifications described herein provide for modifications to provide for an environment in which data is safely processed as between different tenants. In other words, the modifications provide for changes to prevent data from one tenant being affected by operations performed on the platform for another tenant.

The cluster control plane engine 100 is configured to receive different versions of modified API server software, to match the requirements for supporting one or more clusters corresponding to a given cluster control plane, such as cluster 350 and the cluster control plane 315. The modifications can be to one or more ways of serving the one or more platform API(s) managed as part of the API server instance 319. The API server instance 319 can include various mechanisms for serving API requests, such as an aggregator 335, built-in APIs 340, and custom resource definitions (CRDs) 345. In some implementations the API server instance 319 can implement one or more of the platform APIs according to other techniques, such as remote procedure calls, including gPRC, or as one or more REST APIs.

Modifications to the API server instances 319 include modifications to built-ins 340. The built-ins 340 include functions and resources defined and accessible through the platform API. In some implementations, the cluster control plane engine 100 can modify the built-ins 340. The modifications to the built-ins 340 can include modifications that include disabling one or more API functions, depending on, for example, requirements for how platform users of the tenant may or may not need to interact with the platform 105.

Additional modifications can include adding new APIs to be implemented by the API server instance 319. The new APIs can be specified by the tenant, for example as APIs offered by the platform users or imported from another source. The computing platform 105 may impose certain requirements of these new APIs, to match the form and behavior of existing APIs.

Additional modifications to the API server instance 319 include custom resource definitions (CRDs) 345. A custom resource definition is an extension to the platform API. The CRDs 345 can define new functionalities, including functions to enhance or extend existing or new services or applications. The CRDs can also include functions for accessing additional resources, like services, applications, or data stored on one or more devices in communication with the API server instance 319. The API request 301 can include a request that calls one or more functions to access these resources identified in the CRDs 345. The CRDs 345 can vary from instance-to-instance, in response to different custom resources defined or provided by the platform user whose clusters correspond to a given API instance. As part of generating a new API instance, the cluster control plane engine 100 can load any CRDs invoked in containers of clusters, such as the clusters 350, 351, assigned to the API instance 319.

Additional modifications to the API server instance 319 can include modifying how the API server instance 319 persistently stores data corresponding to each tenant. An API server can be configured with persistent memory for storing data. If the API server is not already configured for multi-tenancy, however, then API server instances can be configured so as to separate and isolate data corresponding to each tenant sending API requests, in the persistent memory. In a multi-tenant setting, separation and isolation of data corresponding to each tenant can be important for maintaining the quality of service of the platform for each tenant, and to prevent actions of one tenant from disrupting another.

As another modification, the cluster control plane engine 100 can implement a shared cache 325 of memory. The shared cache 325 can be a combination of persistent storage and other types of memory, such as RAM. In some implementations, the cloud computing platform 105 can be configured to modify an existing cache, such as on a computing platform that does not implement multi-tenancy, as described herein. In general, the shared cache 325 can store immutable data used across the API server instances 318, 319. By storing immutable data in the shared cache, the cluster control plane engine 100 can reduce memory usage as compared with allocating discrete amounts of cache memory to each API server instance 318, 319. The use of the shared cache 315 can also reduce under-utilization of cache memory that is individually allocated for each API server instance but not efficiently used. Because the cluster control plane 315 can save only immutable data to the shared cache 325, the risk of changes in data of one API server instance by another API server instance is reduced or eliminated, even when API server instances correspond to cluster control planes for different tenants.

A currently executing cluster control plane, such as the cluster control plane 315 can save data to the shared cache 325 in a format mutually intelligible to all cluster control planes at least partially implemented on the cluster control plane engine 100. The objects may include information on the types of resources understood by the control plane, including the API schema; documentation; static web content; immutable, globally-visible objects; etc.

A controller for the API server instance 319, such as a specially configured controller implemented by the computing platform 105, can be configured to compute a hash or other unique identifier of the server instance-specific data, and save the data to the shared cache 325. If the instance-specific data later needs to be accessed, a controller for the API server instance 319 can obtain the data from the shared cache 325 and verify a computed hash of the obtained data to determine if it matches the precomputed hash when the data was originally saved.

The shared cache 325 can enforce the integrity of the data saved to the cache, for example by requiring a specific object type, such as a particular schema or template, for data saved to the cache 325. In other words, for API server instance-specific data to be saved, the data must be in the form specified by an object type, for example as defined in the platform API. In this way, the shared cache 325 can mitigate malformed data from potentially corrupting or destroying data in the cache 325.

Other types of data are not stored in the shared cache 325, and can be stored in other storage devices coupled to the server computing device 115. For instance, the cluster control plane 315 can be configured to be notified of changes in states of various items in the clusters 350, 351, and update objects stored in memory separate to the shared cache 325 the shared cache 325 based on the changes. The configuration data for a cluster control plane can include configuration data for the clusters 350, 351, which can include an indication of the current state of the clusters associated with the tenant for the cluster control plane. Other types of data stored separate from shared cache 325 include API definitions for built-ins and CRDs, which can be stored in memory along with the configuration data for a cluster control plane.

In some implementations other shared data between API server instances can be saved to a shared location in memory. For example, in implementations in which the platform API is immutable, each API server instance can access the platform API at a shared location, rather than maintaining a separate copy.

The API server instance 319 can also include an API aggregator 335. The aggregator 335 can be configured to collect all APIs implemented as part of the platform API, including extensions, modifications, and removed portions of one or more APIs in accordance with the modifications reflected in the modified copy of the API server software for the tenant. The aggregator 335 can be configured to route a received API request to the corresponding component of the API server instance 319. The aggregator 335 can further read specifications of all APIs implemented by the API server instance 319 For example, if the API request 301 includes calls to functions or resources defined in the CRDs 345, the aggregator 335 can route the API request 301 to the CRDs 345. In some cases, the aggregator may route API requests to extension API servers running outside of the server computing device 115, for example on another server computing device or on worker node 406.

The cluster control plane 315 may have its own data plane, for example it could orchestrate the deployment of containers to implement various services of an application requested for deployment on the cluster 350. For example, the API request 301 can include a request to deploy an application on one or more containers of a worker node.

Figure 4:
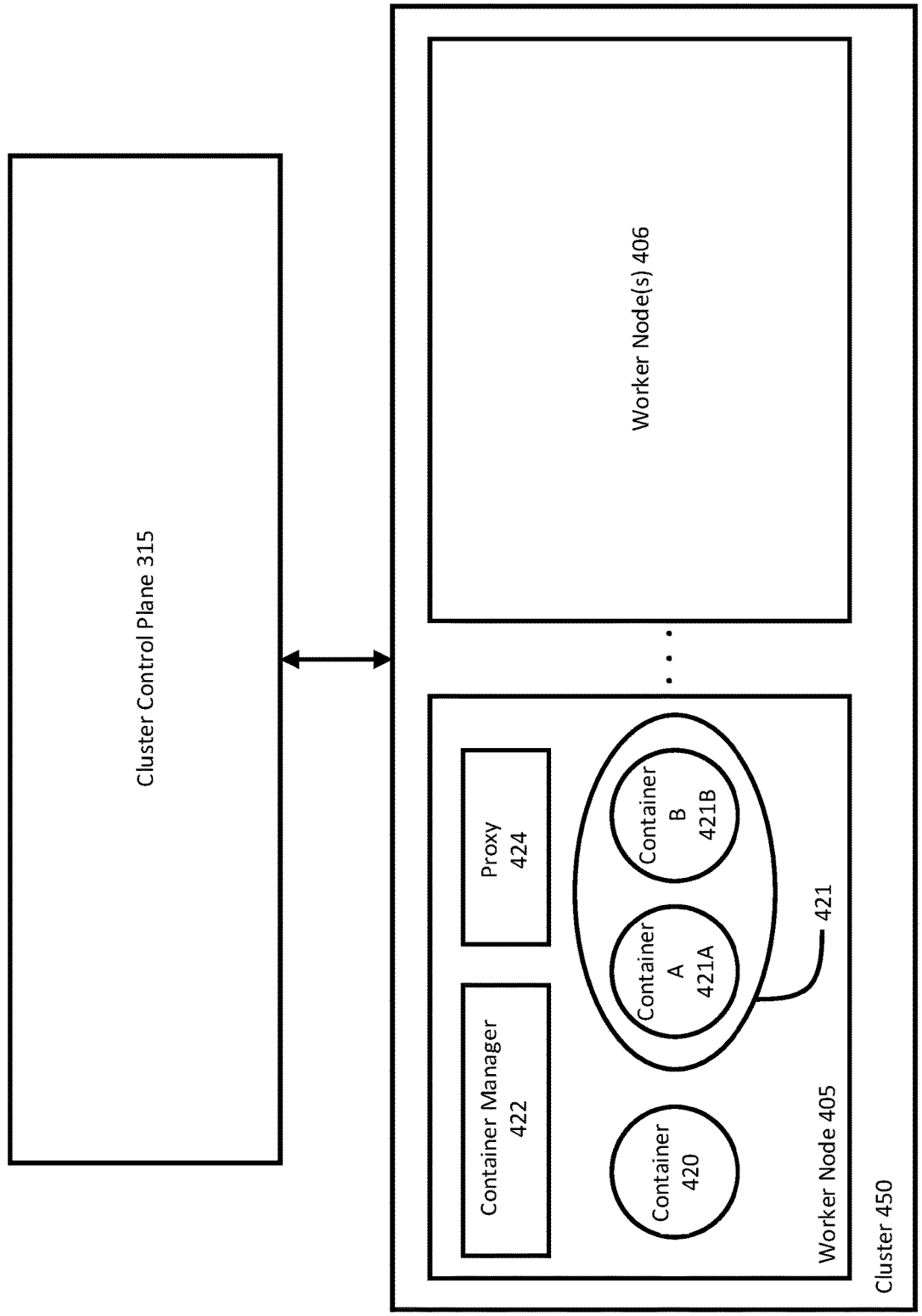
FIG. 4 is a block diagram of the cloud provider control plane communicating with a cluster.

FIG. 4 is a block diagram of the cluster control plane 315 communicating with a cluster 450. The cluster 450 can include a worker node 405 and one or more additional worker nodes 406. Each node of the cluster 450 can be running on a physical machine or a virtual machine. The worker node 405 can include a container 420 and a pod 421 that can include a container A 421A and a container B 421B. The worker node 405 can also include a container manager 422 and a proxy 424. The one or more additional worker nodes 406 can similarly include respective container managers, containers, pods, and proxies (not shown). The cluster control plane 315 can be implemented on one or more cluster control plane nodes reserved by the computing platform, or implemented directly on server computing devices 115, as in this disclosure.

The worker node 405 can execute a variety of different applications and/or services as workloads performed on respective containers for the worker node 405. For example, containers or pods of containers can be exposed to network traffic for performing a service. In addition the worker nodes of the cluster 450 can be organized as part of a pool. For example, a worker node pool may be a group of worker nodes sharing one or more attributes, such as memory size, CPU/GPU attached, etc. In some instances, all worker nodes of a worker node pool may be located in the same location of a cloud, which may be the same datacenter, same region/zone within a datacenter, etc.

The one or more API server instances executing the cluster control plane 315 can manage the workloads and resources of the worker nodes 405, 406 of the cluster 450. The cluster control plane 315 can update objects stored in the cluster 450 consistent with a corresponding API request. The container manager 422 can be configured to start, stop, and/or maintain the containers based on the instructions from the cluster control plane 315. For another example, the cluster control plane 315 can be configured to communicate with proxies of the worker nodes, such as the proxy 424. The proxy 424 may be configured to manage routing and streaming of data through a network or other communication channels. For example, proxies for worker nodes in the cluster 450 can manage streaming of data between worker nodes of the cluster 450.

Rather than an API server executing on one or more allocated control plane nodes, workloads and resources for worker nodes in the cluster 450 can be managed by API server instances that are executed as threads. The API server instances can be spawned and destroyed as needed, unlike an API server executing on allocated nodes, which can be expensive to start and stop in response to incoming API request traffic. From the perspective of the cluster 450, however, the cluster 450 can interact with the cluster control plane whether or not it is implemented as an instance executed on one or more threads. In this way, aspects of the disclosure can be implemented on existing platforms without modifying the nature of the communication between a cluster control plane and a cluster.

Figure 5:
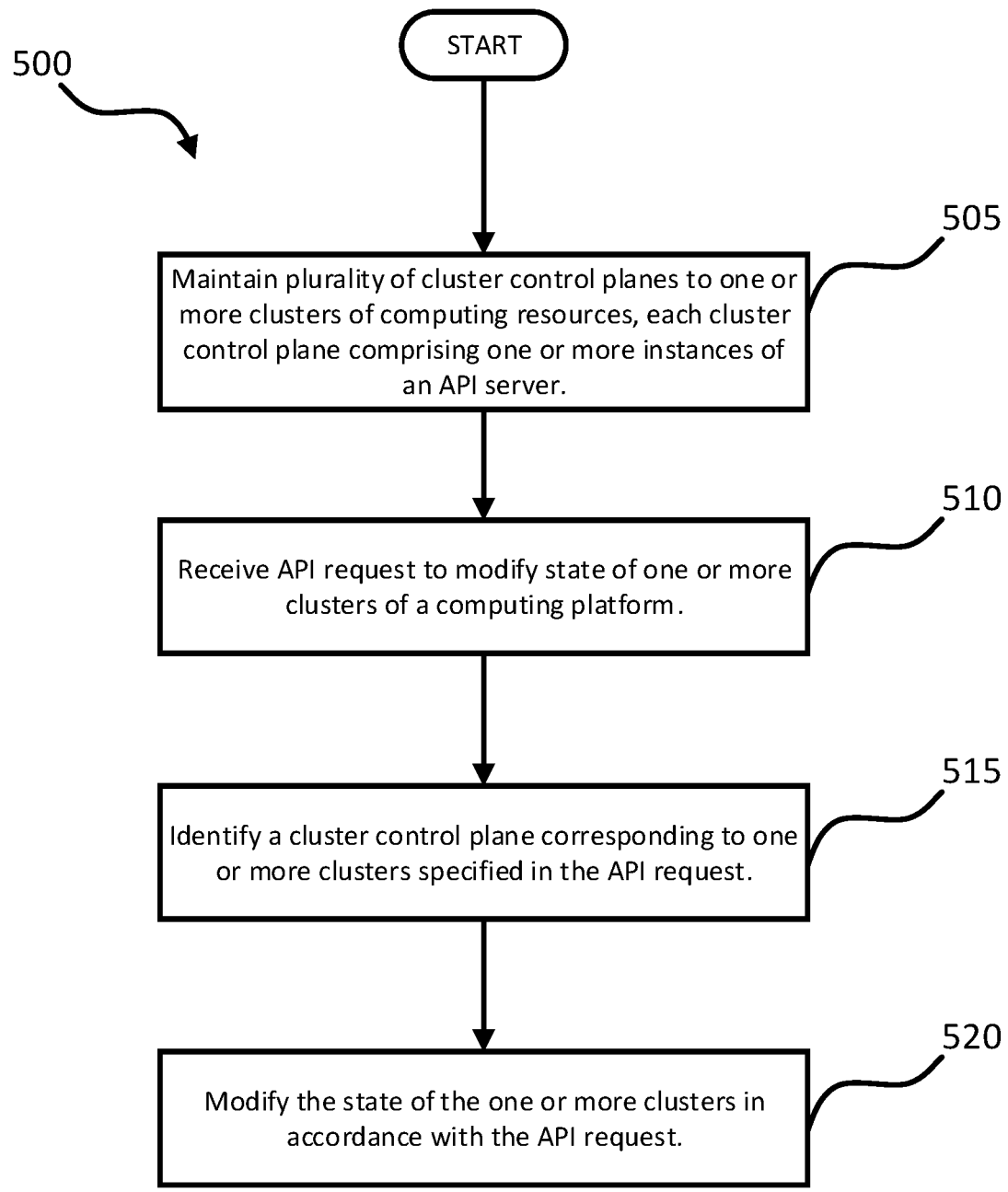
FIG. 5 is a flowchart showing an example process for managing cluster control planes and processing requests to modify or read the state of one or more target nodes.

FIG. 5 is a flowchart showing an example process 500 for managing cluster control planes and processing requests to modify or read the state of one or more target nodes. The process 500 is described as being performed by a computing platform having one or more server computing devices and one or more user computing devices, located in one or more physical locations and programmed in accordance with aspects of this disclosure. For example, the computing platform 105 implementing the cluster control plane engine 100, appropriately programmed, can perform the process 500. Steps 505-520 of the process 500 can be performed in different orders, with additional steps added or some steps as shown in the process 500 removed.

The platform maintains 505 a plurality of cluster control planes to one or more clusters of computing resources, wherein each cluster control plane includes one or more instances of an API server. As described above with reference to FIGS. 2-3, the platform 105 can include a cluster control plane engine 100 configured to maintain cluster control planes on-demand and to execute state modifications of a cluster according to the received API requests. As part of maintaining the cluster control planes, the cluster control plane engine 100 can fork and modify an API server software and run instances thereof configured for executing API requests of a platform API.

The platform receives 510 an API request to modify the state of one or more clusters of the platform. As described above with reference to FIGS. 2-4, the API request can specify computing resources to modify or to obtain information for, such as worker nodes corresponding to the tenant. The cluster control plane engine 100 can cause controllers to monitor and modify the state of cluster(s) that include the one or more target nodes, according to specifications in the received API request. Some API requests can be requests to read at least portions of the current state of the one or more clusters of the platform, for example the current state of an object in the one or more clusters, such as a specific node or pod.

The platform identifies 515 a cluster control plane corresponding to the tenant identified in the received API request. If a cluster control plane does not exist, for example because threads executing API server instances for the cluster control plane were destroyed due to the tenant for the plane being idle, then the thread manager for the cluster control plane engine can spawn new threads, according to aspects of this disclosure described herein with reference to FIG. 3.

The platform causes 520 the identified cluster control plane to modify the state of the one or more clusters in accordance with the API request. As part of modifying the state of the cluster(s) including the target resources specified in the API request, the cluster control plane engine 100 can identify available controllers to monitor the state of each cluster and modify the state according to specifications in the API request. The controller(s) can modify the state of the cluster in general, as well as modify other resources used or controlled by the cluster, such as worker nodes corresponding to the tenant.

Aspects of the disclosure can be implemented so as to realize one or more of the following advantages. A multi-tenant cloud computing platform can be implemented with zero or small marginal cost for additional tenants serviced by the platform. Instead of maintaining separate control planes across specially allocated hardware, a platform configured according to aspects of this disclosure can manage multiple cluster control planes on the same hardware, and manage additional tenants without additional computing resource allocation. Cluster control planes for idle tenants can be destroyed after a predetermined period of time, and new threads can be allocated to service other API requests in the interim.

The zero or small marginal cost for additional tenants can be attributed at least to the management of the multiple cluster control planes as one or more respective threads. New threads can be added without the need to allocate additional computing resources towards maintaining the multiple cluster control planes. In addition, the platform can leverage a shared cache of immutable data to reduce the overall memory requirement for executing the separate cluster control planes, while ensuring that the servicing of one tenant by the platform does not interfere with the servicing of another.

Rather than scale cluster control planes by the number of tenants, instances of API server software for executing API functions can be scaled up or down according to the number of incoming API requests. The scaling can be done by the spawning or destruction of threads instead of as dedicated nodes for each cluster control plane. At the same time, tenant boundaries can be enforced where appropriate, as opposed to conventional approaches in which multiple cluster control planes executing on the same nodes run the risk of service interference for one tenant from another.

By keeping separate instances of software for executing one or more APIs on a computing platform, multiple cluster control planes can independently provide for servicing different requests while allowing tenants to interface with the platform according to a consistent set of interfaces. In other words, the platform can manage changes to how tenants define interaction between the tenant and the platform, while only imposing those changes for that tenant and not any others.

Separate instances of software for executing one or more APIs can also make subsequent modifications for one tenant easier, at least because the modifications can be made independent of execution of API server instances for other tenants. Different instances can be executed as separate threads but on the same process, instead of running whole separate processes for each API server required for each individual tenant.

Aspects of this disclosure can be implemented in digital circuits, computer-readable storage media, as one or more computer programs, or a combination of one or more of the foregoing. Aspects of this disclosure can be performed on or more processors of different types. For example, the one or more processors can include one or more central processing units (CPUs), graphic processing units (GPUs), field-programmable gate arrays (FGPAs), and/or application-specific integrated circuits (ASICs), such as tensor processing units (TPUs). The computer-readable storage media can be non-transitory, for example as one or more instructions executable by a cloud computing platform and stored on a tangible storage device.

A computer program can be written in any type of programming language, and according to any programming paradigm, such as declarative, procedural, assembly, object-oriented, data-oriented, functional, or imperative. A computer program can be written to perform one or more different functions and to operate within a computing environment, such as on a physical device, virtual machine, or across multiple devices. A computer program can also implement functionality described in this specification as performed by a system, cloud provider control plane, module, or model.

In this specification the phrase "configured to" is used in different contexts related to computer systems, hardware, or part of a computer program, module, or cloud provider control plane. When a system is said to be configured to perform one or more first operations, this means that the system has appropriate software, firmware, and/or hardware installed on the system that, when in operation, causes the system to perform the first operation(s). When some hardware is said to be configured to perform one or more operations, this means that the hardware includes one or more circuits that, when in operation, receive input and generate output according to the input and corresponding to the one or more operations. When a computer program, module, or cloud provider control plane, is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments.

The invention claimed is:

1. A system comprising:
one or more processors; and
one or more storage devices in communication with the one or more processors, the one or more storage devices storing instructions, when executed by the one or processors, cause the one or more processors to perform operations comprising:
    maintaining a plurality of cluster control planes, each cluster control plane comprising one or more respective instances of software of an Application Programming Interface (API) server, wherein each cluster control plane is configured to receive API requests and to process the API requests using the respective one or more instances of the API server, the respective one or more instances of the API server being executed as one or more respective threads;
    receiving an API request to modify or read a state for a cluster of computing resources of a computing platform, the cluster of computing resources corresponding to a tenant identified in the API request; and
    in response to receiving the API request:
        identifying a cluster control plane of the plurality of cluster control planes that controls the cluster of computing resources corresponding to the API request,
        determining whether the identified cluster control plane is active for the tenant identified in the API request,
        causing the identified cluster control plane to modify or read the state of the cluster in accordance with the API request when the identified cluster control plane is determined to be active, and
        spawning an operating system thread that executes one or more software threads to modify or read the state of the cluster in accordance with the API request when the identified cluster control plane is determined to be inactive.

2. The system of claim 1, wherein causing the identified cluster control plane to modify or read the state of the cluster comprises causing the identified cluster control plane to modify the execution of one or more worker nodes associated with the cluster control plane.

3. The system of claim 1, wherein the one or more software threads comprise user-level threads and the operating system thread comprises a kernel-level thread.

4. The system of claim 1, wherein the one or more software threads are configured to communicate data between each other across one or more channels, each channel being a data structure configured to accept or transmit data of a particular type.

5. The system of claim 1, wherein the operations further comprise destroying at least one software thread following a predetermined time period after causing the identified cluster control plane to modify or read the state of the cluster.

6. The system of claim 1, wherein causing the identified cluster control plane to modify or read the state of the cluster comprises:
    maintaining a pool of controllers, each controller comprising one or more software threads configured to modify or read a state for one or more clusters;
    configuring a first controller from the pool of controllers to modify or read the state of the cluster;
    removing the first controller from the pool of controllers;
    causing the identified cluster control plane to modify or read the state of the cluster using the first controller; and
    destroying the first controller after using the first controller.

7. The system of claim 1, wherein:
    the cluster comprises a plurality of discrete portions of computing resources, each discrete portion comprising a resource identifier uniquely identifying the discrete portion;
    the API request comprises metadata that includes one or more resource identifiers; and
    identifying the cluster control plane comprises identifying a cluster control plane that corresponds to resources whose identifiers match the one or more resource identifiers in the metadata of the API request.

8. The system of claim 7, wherein the plurality of discrete portions of computing resources comprises at least one of an application, a service, a load balancer, a node, a pod, or a container.

9. The system of claim 1, wherein maintaining the plurality of cluster control planes further comprises storing, in shared memory accessible to the plurality of cluster control planes, immutable data corresponding to the respective instance of the API server for each of the plurality of cluster control planes.

10. The system of claim 1, wherein the operations further comprise generating a cluster control plane comprising an instance of the API server by executing an instance of a modified API server, which is initialized with a configuration specified by a tenant of the computing platform corresponding to the cluster control plane.

11. The system of claim 1, wherein maintaining the plurality of cluster control planes further comprises storing, in separate caches of memory, respective data unique to each of the plurality of cluster control planes, wherein data stored in one of the separate caches for a first cluster control plane of the plurality of cluster control planes is not accessible by a second control plane of the plurality of cluster control planes.

12. A computer-implemented method, comprising:
    maintaining a plurality of cluster control planes, each cluster control plane comprising one or more respective instances of software of an Application Programming Interface (API) server, wherein each cluster control plane is configured to receive API requests and to process the API requests using the respective one or more instances of the API server, the respective one or more instances of the API server being executed as one or more respective threads;
    receiving an API request to modify or read a state for a cluster of computing resources of a computing platform, the cluster of computing resources corresponding to a tenant identified in the API request; and in response to receiving the API request:
    identifying a cluster control plane of the plurality of cluster control planes that controls the cluster of computing resources corresponding to the API request,
    determining whether the identified cluster control plane is active for the tenant identified in the API request,
    causing the identified cluster control plane to modify or read the state of the cluster in accordance with the API request when the identified cluster control plane is determined to be active, and
    spawning an operating system thread that executes one or more software threads to modify or read the state of the cluster in accordance with the API request when the identified cluster control plane is determined to be inactive.

13. The method of claim 12, wherein causing the identified cluster control plane to modify or read the state of the cluster comprises causing the identified cluster control plane to modify execution of one or more worker nodes associated with the cluster control plane.

14. The method of claim 12, wherein the one or more software threads comprise user-level threads and the operating system thread comprises a kernel-level thread.

15. The method of claim 12, wherein the one or more software threads are configured to communicate data between each other across one or more channels, each channel being a data structure configured to accept or transmit data of a particular type.

16. The method of claim 12, wherein the method further comprises destroying at least one software thread following a predetermined time period after executing the identified cluster control plane to modify or read the state of the cluster.

17. The method of claim 12, wherein causing the cluster control plane to modify or read the state of the cluster comprises:
    maintaining a pool of controllers, each controller comprising one or more software threads configured to modify or read a state for one or more clusters;
    configuring a first controller from the pool of controllers to modify or read the state of the cluster;
    removing the first controller from the pool of controllers;
    causing the identified cluster control plane to modify or read the state of the cluster using the first controller; and
    destroying the first controller after using the first controller.

18. The method of claim 12, wherein:
    the cluster comprises a plurality of discrete portions of computing resources, each discrete portion comprising a resource identifier uniquely identifying the discrete portion;
    the API request comprises metadata that includes one or more resource identifiers; and
    identifying the cluster control plane comprises identifying a cluster control plane that corresponds to resources whose identifiers match the one or more resource identifiers in the metadata of the API request.

19. The method of claim 12, wherein maintaining the plurality of cluster control planes further comprises storing, in shared memory accessible to the plurality of cluster control planes, immutable data corresponding to the respective instance of the API server for each of the plurality of cluster control planes.

20. One or more non-transitory computer-readable storage media, comprising instructions that when executed by one or more processors, causes the one or more processors to perform operations comprising:
    maintaining a plurality of cluster control planes, each cluster control plane comprising one or more respective instances of software of an Application Programming Interface (API) server, wherein each cluster control plane is configured to receive API requests and to process the API requests using the respective one or more instances of the API server, the respective one or more instances of the API server being executed as one or more respective threads;
    receiving an API request to modify or read a state for a cluster of computing resources of a computing platform, the cluster of computing resources corresponding to a tenant identified in the API request; and
    in response to receiving the API request:
        identifying a cluster control plane of the plurality of cluster control planes that controls the cluster of computing resources corresponding to the API request,
        determining whether the identified cluster control plane is active for the tenant identified in the API request,
        causing the identified cluster control plane to modify or read the state of the cluster in accordance with the API request when the identified cluster control plane is determined to be active, and
        spawning an operating system thread that executes one or more software threads to modify the state of the cluster in accordance with the API request when the identified cluster control plane is determined to be inactive.

\* \* \* \* \*